United States Patent [19]

Nagler

[11] Patent Number: 4,785,060

[45] Date of Patent: Nov. 15, 1988

[54] SOIL RELEASE PROMOTING PET-POET COPOLYMER, METHOD OF PRODUCING SAME AND USE THEREOF IN DETERGENT COMPOSITION HAVING SOIL RELEASE PROMOTING PROPERTY

[75] Inventor: Meshulam Nagler, Teaneck, N.J.

[73] Assignee: Colgate-Palmolive Company, New York City, N.Y.

[21] Appl. No.: 901,218

[22] Filed: Aug. 28, 1986

[51] Int. Cl.$^4$ .............. C08G 63/04; C08G 63/34; C08G 65/32; C08L 71/02

[52] U.S. Cl. .................. 525/444; 252/174.23; 252/DIG. 15; 525/408; 528/279; 528/285

[58] Field of Search ............. 528/275, 279, 285; 252/DIG. 15, 174.23, 8.8; 427/393.4; 525/408, 444

[56] References Cited

U.S. PATENT DOCUMENTS

| | | | |
|---|---|---|---|
| 3,047,515 | 7/1962 | Piirma | 528/279 |
| 3,652,713 | 3/1972 | Okazaki | 524/245 |
| 3,723,568 | 3/1973 | Hoeschele | 525/438 |
| 3,959,230 | 5/1976 | Hays | 252/8.9 |
| 4,003,882 | 1/1977 | Fagerburg et al. | 528/279 |
| 4,049,635 | 9/1977 | Cleary | 528/279 |
| 4,062,907 | 12/1977 | Sublett | 528/301 |
| 4,104,263 | 8/1978 | Kenney | 528/279 |
| 4,115,371 | 9/1978 | Bier et al. | 528/275 |
| 4,116,885 | 9/1978 | Derstadt et al. | 252/DIG. 15 |
| 4,128,533 | 12/1978 | Kohler et al. | 528/279 |
| 4,132,680 | 1/1979 | Nicol | 252/DIG. 2 |
| 4,251,652 | 2/1981 | Tanaka et al. | 528/279 |
| 4,356,299 | 10/1982 | Cholod et al. | 528/279 |
| 4,365,054 | 12/1982 | Stabley, Jr. | 528/279 |
| 4,411,831 | 10/1983 | Robinson et al. | 252/174.23 |
| 4,427,557 | 1/1984 | Stockburger | 252/DIG. 15 |
| 4,571,303 | 2/1986 | Ciallella | 252/174.23 |
| 4,661,287 | 4/1987 | Crossin | 252/174.12 |

FOREIGN PATENT DOCUMENTS

| | | |
|---|---|---|
| 2123848 | 2/1984 | United Kingdom . |
| 2137652 | 10/1984 | United Kingdom . |
| 2172608 | 9/1986 | United Kingdom . |

*Primary Examiner*—Paul Lieberman
*Assistant Examiner*—Linda D. Skaling
*Attorney, Agent, or Firm*—M. M. Grill; N. Blumenkopf

[57] ABSTRACT

A soil release promoting copolymer of polyethylene terephthalate and polyoxyethylene terephthalate (PET-POET) having a weight average molecular weight in the range of 15,000 to 35,000, and a PET:POET molar ratio of about 2:1 to 6:1, is prepared by reacting polyethylene terephthalate with polyethylene glycol in the presence of a catalyst system including both antimony trioxide and calcium acetate or both titanium isopropoxide and sodium isopropoxide. The PET-POET copolymer provides improved soil release properties for oily and greasy stains from polyester fabrics at high and low wash temperatures and is stable even at high alkalinity levels. The starting PET can advantageously be obtained from scrap bottles.

5 Claims, No Drawings

SOIL RELEASE PROMOTING PET-POET COPOLYMER, METHOD OF PRODUCING SAME AND USE THEREOF IN DETERGENT COMPOSITION HAVING SOIL RELEASE PROMOTING PROPERTY

This invention relates to improved polyethylene terephthalate - polyoxyethylene terephthalate (PET-POET) soil release promoting copolymers, methods for production thereof and liquid and particulate detergent compositions containing the PET-POET copolymers. More particularly, this invention relates to PET-POET soil release copolymers of higher than normal molecular weight having improved hydrolytic stability and shelf life and improved soil release promoting properties, particularly for removal of oily soil from polyester fabric.

The use of PET-POET soil release promoting polymers is well documented in the patent literature. Representative examples of the patent literature disclosing the use of PET-POET and similar polymers in the treatment of synthetic textile materials in general and in laundry detergent compositions in particular include, among others, U.S. Pat. Nos. 3,557 039 (and its corresponding British Patent G.B. No. 1,088,984); 3,652,713; 3,723,568; 3,959,230; 3,962,152; 4,125,370; 4,132,680; 4,569,772; and British Patent Specifications G.B. Nos. 1,154,370; 1,317,278; 1,377,092.

U.S. Pat. No. 3,557,039 to McIntyre, et al. shows the preparation of such copolymers by the ester interchange and subsequent polymerization of dimethyl terephthalate (DMT) and ethylene glycol (EG) in the presence of a mixed catalyst system of calcium acetate hemihydrate and antimony trioxide. A similar reaction is shown in U.S. Pat. No. 3,959,280 to Hays, this patent further using polyethylene oxide as one reactant in addition to DMT and EG monomers. The PET-POET copolymers of Hays are characterised by a molar ratio of ethylene terephthalate units to polyethyle oxide terephthalate units of from about 25:75 to about 35:65, by the polyethylene oxide of the polyethylene oxide terephthalate having a molecular weight of from about 300 to 700, by the molecular weight of about 25,000 to about 55,000, and by a melting point below 100° C.

U.S. Pat. No. 3,652,713 forms antistatic fibers, films and other shaped articles from compositions in which polyethylene terephthalate is mixed with a polyetherpolyester block copolymer such that the polyether segment constitutes from 0.1 to 10.0% by weight based on the total weight of the mixture. The polyether-polyester block copolymer can be prepared by melt-polymerizing (condensation polymerization) polyethylene terephthalate of number average molecular weight of from 1,000 to 2,000 with polyethylene glycol having a number average molecular weight of from 1,000 to 50,000 at a highly reduced pressure and elevated temperature in the presence of antimony trioxide and trimethyl phosphate.

According to G.B. No. 1,317,278 to Ambler, et al. high molecular weight (e.g. spinning grade or film-forming) polyethylene terephthalate is reacted with polyethylene glycol (MW=300 to 20,000) at temperatures in the range of 100° C. to 300° C., preferably at atmospheric pressure in the presence of conventional ester exchange catalyst, for example, antimony oxides, calcium acetate, tetraalkyltitanates and stannous octoate.

U.S. Pat. No. 4,125,370 to Nicol discloses PET-POET solid release promoting random copolymers having an average molecular weight in the range of about 5,000 to about 200,000, with a molar ratio of ethylene terephthalate to polyethylene oxide terephthalate of from about 20:80 to 90:10, the polyethylene oxide linking unit having a molecular weight in the range from about 300 to 10,000. These polymers can be prepared according to the procedure disclosed in the aforementioned U.S. Pat. No. 3,959,280 to Hays or by the process described in U.S. Pat. No. 3,479,212 to Robertson, et al.

PET-POET soil release promoting polymers are also commercially available, for example, the products Alkaril QCJ and QCF from Alkaril Chemicals, Inc.; Milease T from ICI America; and Zelcon from E. I. du Pont de Nemours & Co.

While satisfactory soil release promoting property has been obtained from the commercially available products and as described in the literature, there have been problems with regard to the stability, as well as effectiveness, of these copolymers during storage and under actual use conditions. Thus, U.S Pat. No. 4,125,370 teaches providing a concentration of certain hardness ions to promote deposition of the soil release polymers on the fabrics being washed and to promote soil release performance. U.S. Pat. No. 4,569,772 teaches that detergent compositions containing PET-POET polymers tend to lose their soil release promoting properties on storage if the compositions contain alkaline builders. The patentees overcome the tendency by comelting the PET-POET copolymer with a water soluble alkali metal polyacrylate and converting the melt to solid particles.

Nevertheless, still further improvements are required for the stability and oily soil release properties of PET-POET copolymers, especially at low temperatures and under alkaline wash conditions. Furthermore, since the detergent compositions containing soil release promoting polymers are intended primarily for use as a consumer item for sale to individual users for home laundry washing machines it is apparent that cost of additives is a critical factor for the manufacturer and, therefore, any means which can lower production costs without adversely affecting performance or consumer acceptance is of great practical importance.

Generally, those of skill in the art relating to the PET-POET soil release promoting polymers have concentrated their efforts towards improving product performance by modifying the ratios of PET to POET, or modifying molecular weight of the oxyethylene linking units or by adding still additional stabilizing ingredients, and so on.

However, so far as the present inventor is aware, no particular efforts have been made with regard to the polymer forming process, per se, or to the source of the starting materials used to prepare the PET-POET copolymers.

Accordingly, it is an object of the invention to provide soil release promoting polymers with improved stability and performance, particularly for hard to remove oily soils on hydrophobic fabrics.

It is another object of the invention to provide an improved process for preparing PET-POET soil release promoting polymers.

Still another object of the invention is to reduce the cost of PET-POET soil release promoting polymers, and consequently the cost of detergent compositions containing same.

A corresponding object of the invention is to provide built liquid and solid particulate laundry detergent compositions having improved cleaning performance at low temperatures as well as high temperatures and under highly alkaline as well as at neutral or slightly alkaline washing conditions for removing oily soils from polyester and other hydrophobic fabrics.

These and other of the objects and goals accomplished by the present invention, which will become more apparent after reading the following detailed description and specific examples, have been accomplished, in the first instance, by the discovery that higher molecular weight copolymers have better soil release properties against a variety of soils and fabrics than lower molecular weight copolymers, and that the polymerization conditions, and particularly the starting materials and the catalyst system, greatly contributes to polymer performance. Secondly, the inventor has discovered that as the starting ethylene terephthalate component, scrap polyester polymer of film-forming grade can be used with equivalent results as freshly prepared polyester polymer, thereby significantly lowering cost of production of the PET-POET copolymer.

The soil release promoting copolymer of polyethylene terephthalate (PET) and polyoxyethylene terephthalate (POET) according to this invention has a molecular weight (weight average, $\overline{M}w$) of from about 15,000 to about 35,000 and is prepared by the polycondensation reaction between polyethylene terephthlate and polyethylene glycol in the presence of a mixed catalyst system of (a) antimony trioxide ($Sb_2O_3$) and calcium acetate or (b) titanium (IV) isopropoxide and sodium isopropoxide. The reaction is carried out at an elevated temperature such as 100° C. to 350° C. and at reduced pressure, such as less than 5 mm Hg. In the product PET-POET copolymer, the polyoxyethylene $-(OCH_2CH_2)_n$ linking units should have a molecular weight in the range of from about 500 to about 10,000 (corresponding to values of n of from about 12 to about 230) and the molar ratio of ethylene terephthalate units to polyoxyethylene terephthalate units should be within the range of from about 2:1 to about 6:1. The PET-POET soil release copolymers can be added in soil release promoting proportions to liquid or solid (granular or powdery) particulate detergent compositions including, one or more water-soluble anionic, nonionic, zwitterionic, cationic and ampholytic surface active agents, and one or more water soluble or water dispersible detergent builder compounds.

According to the conventional commercial practice, as understood by the present inventor, a two-step process in which dimethyl terephthalate is reacted with ethylene glycol and poly(ethylene glycol), is most commonly used to produce PET-POET copolymers having soil release properties. In contrast, according to this invention a single step polycondensation polymerization reaction is carried out by reacting polyethylene terephthalate polymer with polyethylene glycol. Thus, the process of this invention is inherently less costly than the two step method. An additional important advantage is that the use of dimethyl terephthalate, a suspected carcinogen, is avoided.

During study of the properties of one commercially available PET-POET soil release copolymer, Alkaril QCF, it was noted that the molecular weight of the copolymer, as measured in the analytical department of Colgate Palmolive, the assignee of the subject application, and as subsequently confirmed by an independent consultant analyst, is only about 8,000 ($\overline{M}w$) and not the 22,000 $\overline{M}w$ stated by the manufacturer.

Although the patent literature discussed above mentions broad ranges of molecular weights of PET-POET copolymers, e.g. 5,000 to 200,000, and even provides some teaching for increasing molecular weights, there does not appear to be any recognition or appreciation that the performance or stability of the copolymer is a function of polymer molecular weight. For instance in the aforementioned U.S. Pat. No. 4,125,370 to Nicol it is mentioned at column 15, in connection with Example II that the soil release copolymers A-E of Table I in column 9, having stated molecular weights of 20,000; 50,000; 40,000; 100,000; and 40,000, respectively all provide substantially the same results. The same teaching is made in Example VIII, column 17, of the Nicol patent.

Therefore, it was most surprising to find that with the PET-POET soil release copolymer produced from polyethylene terephthlate and polyethylene glycol the stability and performance were significantly better as the molecular weight was increased, best performance being found in the molecular weight range of 15,000 to 35,000. Furthermore, while very good soil removal performance was achieved with the high molecular weight copolymer obtained using antimony trioxide alone as the esterification catalyst, the color of the copolymer was quite poor: (PET-POET, $\overline{M}w=35,000$ PET/OET molar ratio: 2.6/1; Klett color=250). Also, in many cases, performance under highly alkaline conditions, such as pH>10.5, was significantly lower, often by as much as 50% or more, than under neutral or mildly alkaline condition, such as pH=7.0 to 9.5.

These drawbacks have now been largely avoided by carrying out the polycondensation reaction between polyethylene terephthalate, especially recovered scrap PET, and polyethylene glycol in the presence of a mixed catalyst system of (a) antimony trioxide and calcium acetate or (b) titanium (IV) isopropoxide and sodium isopropoxide.

In either catalyst system weight ratios of the individual catalysts can range from about 3:1 to 1:3. Equal weight ratios (i.e. 1:1) are preferred.

The starting polyethylene terephthalate is conveniently derived from scrap material composed of polyethylene terephthalate. Two convenient sources of scrap PET are soda bottles and x-ray film base and sources of such scrap PET are commercially available.

Generally, the PET starting reactant will have a molecular weight (weight average, $\overline{M}w$) of from about 10,000 to about 200,000, preferably from about 20,000 to about 100,000. Conveniently the scrap PET or other PET starting material is provided in the form of finely ground powder, but may also be in the form of coarse powder granules, chips, pellets, and so on.

The other starting reactant is polyethylene glycol. Any grade of polyethylene glycol can be used in this invention insofar as it has a molecular weight in the range of from about 500 to 10,000, preferably from about 1,000 to about 5,000. Polyethylene glycols in this molecular weight range are readily commercially available, for example, under the tradename Carbowax, a product of Union Carbide.

The polyethylene terephthalate-polyoxyethylene terephthalate copolymer is a linear block copolymer wherein the specified polymer segments are chemically bonded by the condensation polymerization, under melt-polymerization conditions, of the starting polyethylene terephthalate polymer and the starting polyethylene glycol polymer.

The melt condensation polymerization is performed a elevated temperature, such as 100° C. to 350° C., preferably from about 200° C. to 300° C. and at a highly reduced pressure, such as less than about 5 mm Hg, preferably less than 1 mm Hg, for example, 0.1 to 0.2 mm Hg, in the presence of the mixed catalyst system.

In a typical procedure, from about 5 to 30 parts PET and 70 to 95 parts PEG are mixed at from about 90° C. to 180° C. (at least above the melting temperature of the reactant having the lower melting point) and a catalytically effective amount, such as from about 0.0001 to 0.1 part, preferably from about 0.001 to 0.05 part, of the mixed catalyst system is added to the mixture. A vacuum is then applied and the temperature is raised to from about 200° C. to 350° C., preferably 250° C. to 300° C., and the reaction proceeds with liberation of ethylene glycol. At the completion of the reaction, generally about 0.5 to 10 hours, the vacuum is released and the product is cooled at ambient temperature.

The product PET-POET copolymer having a molecular weight $\overline{M}w$ of from 15,000 to 35,000, and a PET-:OET molar ratio of from about 2:1 to 6:1, has excellent soil release promoting properties when applied to polyester or polyester blend (usually with cotton) fabrics, either directly from a solution or dispersion thereof, but primarily as a component of or additive to laundry detergent compositions. It has been found that laundry, especially laundry in which the fabrics are of polyesters or polyester blends (usually with cotton), more readily release various soils to the wash water during washing with built synthetic organic detergent compositions, especially those based on nonionic detergents, if the soiling of the laundry takes place after it has been washed with such a detergent composition containing the PET-POET polymer. Some of the polymer is held to the laundry during the washing operation so that it is present thereon when the laundry is subsequently soiled, and its presence promotes the removal of the soil and/or stain during a subsequent washing.

Surprisingly, it has been found that the soil release promoting activity of the PET-POET polymer in detergent compositions is only slightly reduced when it is subjected to contact with alkaline materials, as in such built detergent compositions in which the builder salt is alkaline (as many of them are) or is used at low washing temperature, e.g. below 100° F.

The detergent compositions to which the PET-POET polymers of this invention may be added or in which such may be included, to give the detergent composition desirable soil release promoting properties, are built synthetic organic detergent compositions. The synthetic organic detergent will normally be a nonionic detergent, or mixtures of nonionic and anionic detergents, small amounts of amphoteric or zwitterionic detergents may also be useful under certain conditions.

The anionic detergent which may be employed is preferably a higher linear alkylbenzene sulfonate or a higher fatty alcohol polyethoxylate sulfate. Normally, water soluble salts of such materials are preferred, such as the alkali metal salts, and of these, sodium salts are usually preferred over the potassium salts. When the anionic detergent is a sodium higher alkylbenzene sulfonate, the higher alkyl will normally be of 10 to 18 carbon atoms, preferably 12 to 16 carbon atoms and more preferably 12 or 13 carbon atoms, e.g. 12. When such anionic detergent is a higher fatty alcohol polyethoxylate sulfate, the higher fatty alcohol will be of 10 to 20 carbon atoms, preferably 12 to 16 carbon atoms and more preferably 12 to 13 or 12 to 15 carbon atoms, and the polyethoxylate will include 2 or 3 to 20 ethoxy groups, preferably 3 to 10 thereof, and more preferably 3 to 6, e.g. 3. Mixtures of such anionic detergents may be employed, usually in ratios of 1:10 to 10:1, such as 1:2 to 2:1.

Of the nonionic detergents it is preferred to employ those which are condensation products of ethylene oxide and/or propylene oxide with each other and with hydroxyl-containing bases, such as higher fatty alcohols, Oxo-type alcohols and nonyl phenol. Most preferably the higher fatty alcohol is employed and is of 10 to 20 carbon atoms, preferably 12 to 15 or 16 carbon atoms, and the nonionic detergent contains from about 3 to 20 or 30 ethylene oxide groups per mole, preferably 6 to 11 or 12. Most preferably the nonionic detergent will be one in which the higher fatty alcohol is of about 12 to 15 or 12 to 14 carbon atoms and which contains from 6 or 7 to 11 moles of ethylene oxide. Among such detergents is Alfonic® 1214–60C, sold by Conoco Division of E. I. DuPont De Nemours, Inc., and Neodols® 23–6.5 and 25–7, available from Shell Chemical Co. Among their especially attractive properties, in addition to good detergency with respect to oily and greasy soil deposits on goods to be washed, and excellent compatibility with the present polymeric release agents, is a comparatively low melting point, which is still appreciably above room temperature, so that in the case of said detergent compositions they may be sprayed onto base beads as a liquid which solidifies quickly after it has penetrated into the beads. In addition, they have a compatibility with soluble anionic detergents of the linear higher alkylbenzene sulfonate and higher fatty alcohol polyethoxylate sulfate types, and long term viscosity stability, especially in aqueous and aqueous alcoholic solutions.

Various builders and combinations thereof which are effective to complement the washing action of the nonionic synthetic organic detergent(s) and to improve such action include both water soluble and water insoluble builders. Of the water soluble builders, which preferably are employed in mixture, both inorganic and organic builders may be useful. Among the inorganic builders those of preference include: various phosphates, usually polyphosphates, such as the tripolyphosphates and pyrophosphates, more specifically the sodium tripolyphosphates and sodium pyrophosphates, e.g. pentasodium tripolyphosphate, tetrasodium pyrophosphates; sodium carbonate; sodium bicarbonate; and sodium silicate; and mixtures thereof. Instead of a mixture of sodium carbonate or sodium bicarbonate, sodium sesquicarbonate may often be substituted. The sodium silicate, when employed is normally of $Na_2O$:$SiO_2$ ratio within the range of 1:1.6 to 1:3, preferably 1:2.0 to 1:2.4 or 1:2.8, e.g. 1:2.4.

Of the water soluble inorganic builder salts the phosphates will usually be employed with a lesser proportion of sodium silicate, the carbonates will be employed with bicarbonate and sometimes with a lesser proportion of sodium silicate, and the silicate will rarely be used alone. Instead of individual polyphosphates being utilized it will sometimes be preferred to employ mixtures of sodium pyrophosphate and sodium tripolyphosphate in proportions within the range of 1:10 to 10:1, preferably 1:5 to 5:1. Of course, it is recognized that changes in phosphate chemical structure may occur during crutching and spray drying so that the final product may differ somewhat from the components charged to the crutcher.

Of the water soluble organic builders, nitrilotriacetic acid salts, e.g. trisodium nitrilotriacetate (NTA), preferably employed as the monohydrate, are preferred. Other nitrilotriacetates, such as disodium nitrilotriacetate, are also useful. The various water soluble builder salts may be utilized in hydrated forms, which are often preferred. Other water soluble builders that are considered to be effective include the inorganic and organic phosphates, borates, e.g. borax, citrates, gluconates, ethylene diamine tetraacetates and iminodiacetates. Preferably the various builders will be in the forms of their alkali metal salts, either the sodium or potassium salts, or mixtures thereof, but sodium salts are normally more preferred. In some instances, as when neutral or slightly acidic detergent compositions are being produced, acid forms of the builders, especially of the organic builders, may be preferable but normally the salts will either be neutral or basic in nature, and usually a 1% aqueous solution of the detergent composition will be of a pH in the range of 9 to 11.5, e.g. 9 to 10.5.

Insoluble builders, generally of the Zeolite A type, may be used advantageously in the compositions of the present invention, and of these, hydrated Zeolites X and Y may be useful too, as may be naturally occurring zeolites and zeolite-like materials and other ionexchanging insoluble compounds that can act as detergent builders. Of the various Zeolite A products, Zeolite 4A has been found to be preferred. Such materials are well known in the art and methods for their manufacture need not be described here. Usually such compounds will be of the formula

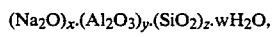

$(Na_2O)_x \cdot (Al_2O_3)_y \cdot (SiO_2)_z \cdot wH_2O$, wherein x is 1, y is from 0.8 to 1.2, preferably about 1, z is from 1.5 to 3.5, preferably 2 to 3 or about 2, and w is from 0 to 9, preferably 2.5 to 6.

The zeolite builder should be a univalent cationexchanging zeolite, i.e. it should be an aluminosilicate of a univalent cation such as sodium, potassium, lithium (when practicable) or other alkali metal or ammonium. Preferably the univalent cation of the zeolite molecular sieve is an alkali metal cation, especially sodium or potassium, and most preferably it is sodium. The zeolites, whether crystalline or amorphous, are capable of reacting sufficiently rapidly with calcium ions in hard water so that, alone or in conjunction with other water softening compounds in the detergent composition, they soften the wash water before adverse reactions of such ions with other components of the synthetic organic detergent composition occur. The zeolites employed may be characterized as having a high exchange capacity for calcium ion, which is normally from about 200 to 400 or more milligram equivalents of calcium carbonate hardness per gram of the aluminosilicate, preferably 250 to 350 mg. eq./g., on an anhydrous zeolite basis. Also they preferably reduce the hardness quickly in wash water, usually within the first 30 seconds to five minutes after being added to the wash water, and lower the hardness to less than a milligram of $CaCO_3$ per liter within such time. The hydrated zeolites will normally be of a moisture content in the range of 5 to 30%, preferably about 15 to 25% and more prefrably 17 to 22%, e.g. 20%. The zeolites, as charged to a crutcher mix from which base beads may be made, should be in finely divided state, with the ultimate particle diameters being up to 20 microns, e.g. 0.005 to 20 microns, preferably 0.01 to 8 microns mean particle size, e.g. 3 to 7 microns, if crystalline, and 0.01 to 0.1 micron, e.g. 0.01 to 0.05 micron, if amorphous. Although the ultimate particle sizes are much lower, usually the zeolite particles will be of sizes within the range of No. 100 to 400 sieve, preferably No. 140 to 325 sieve, as charged to the crutcher for the manufacture of the base beads. In the base beads the zeolite(s) will often desirably be accompanied by a suitable builder salt or salts, e.g. sodium carbonate, sodium bicarbonate. Sodium silicate may tend to agglomerate with zeolites so the proportion thereof present in zeolite-built base beads may be limited, as to 2 or 3%, or it may be omitted, especially for carbonate-containing formulations, but sometimes as much as 5 to 10% may be present, as in NTA-built products.

When employing the preferred nonionic detergents in detergent compositions to which the powder or flakes of the present invention are added to impart soil release promoting properties, while phosphate builders are useful, often carbonate builder is preferred. The carbonate, being of the higher alkalinity, has a more detrimental effect on the stability of the PET-POET polymer and accordingly, detergent compositions built with it, and which contain conventional PET-POET polymer, can often lose the soil release promoting activity of the polymer after relatively short storage periods. Accordingly, the need for the present invention is often greatest for detergent compositions built with carbonate.

In addition to the synthetic organic detergent and builder, detergent compositions will usually also contain a limited proportion of moisture and various adjuvants. Among the adjuvants are fabric softening materials, such as bentonite and other clay fabric softeners, fluorescent brighteners, such as the distilbene brighteners, enzymes, such as proteolytic and amylolytic enzymes, colorants, such as dyes and pigments, and perfumes.

In preferred solid particulate detergents the nonionic detergent (preferably Neodol 23-6.5), is post-sprayed onto base beads (largely builder) and constitutes from 10 to 30%, more preferably 15 to 25% and most preferably about 20% of the final composition. In the final particulate composition the moisture content will usually be from 4 to 14%, preferably 5 to 10%, e.g. about 7 or 8%, the fabric softening clay content will usually be up to about 10%, such as from 1 to 5%, preferably 2 to 4%, e.g. 3%, the enzyme content will usually be up to about 5%, normally from 0.5 to 3%, preferably 1 to 2%, e.g. 1.5%, and the PET-POET polymer content will be from 2 to 10%, preferably 2 to 6%, and more preferably about 4%. Such composition may also often have presented a relatively small proportion, usually from 0.5 to 3%, of magnesium sulfate, which is added to the crutcher to prevent undesirable setting of the crutcher mix for the base beads.

To manufacture the detergent compositions described a crutcher mix is made at a temperature of about 50° C. to 70° C. and a moisture content of about 30 to 60%, of the clays, builders, magnesium sulfate, colorants and fluorescent brightener, and such is spray dried, in the normal manner, using a conventional production spray tower in which hot combustion products dry atomized droplets of the crutcher mix to the base beads, which normally will be of particle sizes in the range of 10 to 100, U.S. Sieve Series. Onto such dried particles there will be sprayed or dripped molten nonionic detergent, which will be absorbed by the beads and will solidify in them, after which there will be mixed with the built detergent composition resulting the powdered or flaked stabilized PET-POET polymer, of particle sizes less than No. 30, U.S. Sieve Series (preferably 30–100). Enzyme powder, if present, will then be mixed in. Alternatively, in some processes the stabilized polymer may be mixed with the enzyme powder before blending with the rest of the particulate detergent. In some procedures the stabilized polymer may be blended with the base beads before application of the nonionic detergent, and the nonionic detergent may then serve to hold the polymer particles more strongly to the base beads. The various blending operations may be conducted in conventional inclined drum or twin-shell blenders or in other suitable equipment. Perfume, when present, may be applied at any suitable stage but usually is the last added component.

Alternatively, the PET-POET soil release promoting polymers may be added to or incorporated in liquid detergent formulations which may be aqueous systems or may be anhydrous or at least substantially anhydrous. In the anhydrous system, the liquid carrier system is typically comprised totally or predominantly of liquid nonionic surfactant. In the aqueous form, the aqueous medium employed includes water and preferably also includes a lower alkanol. The water is desirably deionized water but city water of a hardness content up to about 300 p.p.m., as calcium carbonate (the hardness is usually of mixed magnesium and calcium ions) may be employed, although it is preferable for the hardness content to be less than 100 p.p.m. to help to avoid any destabilization of the liquid detergent or separations of parts thereof. The lower alkanol may be methanol, ethanol, isopropanol or n-propanol but ethanol is much preferred. When ethanol is employed, it will normally be as a denatured alcohol, such as 3A, which includes a small portion of water plus denaturant. Small amounts of compatible dissolved salts may also be present in the aqueous medium but normally such will be avoided.

Another liquid that may desirably be employed in the present liquid detergents is a lower glycol, such as one of 3 to 6 carbon atoms in the alkyl group thereof. While hexylene glycol may be utilized in some formulations, in some others it can promote instability, so propylene glycol is preferred.

Together with the combination of synthetic organic detergent, soil release promoting polymer and aqueous medium there will often be present a fluorescent brightener, such as one of the aminostilbene type. Such a brightener is substantive to the laundry and helps to improve its appearance after washing. A preferred such brightener is Tinopal 5BM Extra Conc., marketed by CIBA-Geigy.

Various suitable adjuvants may be present in the invented liquid detergents, such as fluorescent dyes, colorants (dyes and water dispersible pigments, such as ultramarine blue), bactericides, fungicides and perfumes. Concentrations of such components will usually be kept low, often less than 1% and preferably less than 0.7%. Thus, the perfume concentration will be less than 1%, preferably 0.2 to 0.6%, e.g. 0.4%. The fluorescent brightener will preferably be a stilbene brightener and the content thereof will be from 0.05 to 0.25%, preferably 0.05 to 0.15%, e.g. 0.1%. Colorants, such as Polar Brilliant Blue, will be from 0.001 to 0.03%, preferably 0.002 to 0.02%, e.g. 0.0025% or 0.01%. The various adjuvant materials will be chosen for their compatibility with the other formula components and for non-separating and non-settling characteristics. Because water soluble ionizable salts, whether inorganic or organic, are generally incompatible with soil release promoting agents, their presence will usually be avoided. Generally, it will be desirable to avoid the presence of adjuvants other than colorant, perfume, fluorescent brightener and any neutralizing agents that may be employed to adjust the pH of the liquid detergent to the stable range. It is preferred that the neutralizing agent employed, usually to increase the pH of the liquid detergent mixture, will be sodium hydroxide, in aqueous solution at a concentration of from 5 to 40%, e.g. 15 to 25%. Triethanolamine salts and free triethanolamine should generally be avoided.

The liquid detergent made will be of a desirable viscosity, often in the range of 50 to 500 centipoises, preferably 100 to 200 centipoises, and the viscosity may be adjusted by modifying the proportion of lower alkanol, within the range given. The liquid detergent will be readily pourable but will possess a desired "body." The pH thereof will be in the range of 6 to 10, preferably 6.1 to 8.9 and often more preferably 6.5 to 7.5.

To make the soil release promoting liquid detergents of this invention which are of improved stability on storage, so that the soil release promoting polymer does not deteriorate and does not separate from the rest of the composition, the proportions of the various components will be such that the nonionic detergent (which includes mixtures thereof) or a mixture of nonionic and anionic detergents (both being of the synthetic organic type) will be within the range of 25 to 50% of the product, preferably being 20 to 40% for the nonionic detergent and 3 to 15% for the anionic detergent. More preferably, the proportions of such detergents will be 25 to 35% and 5 to 10%, respectively, e.g. about 32% and about 7%, respectively. The soil release promoting polymer will be about 0.5 to 10%, preferably 1 to 6% and more preferably 1 to 3%, e.g. about 2%. The lower alkanol content will be from 3 to 15%, preferably 5 to 12% and more preferably 6 to 10%, e.g. about 8%, and the water content, when lower alkanol is present, will be about 30 to 60%, preferably 45 to 55%, and if no lower alkanol is present such ranges will be increased to allow for replacement of the lower alkanol with water.

As was previously indicated the contents of ionizable water soluble salts, whether organic or inorganic, should be kept low, usually being no more than 1% of the liquid detergent, preferably less than 0.5% and more preferably less than 0.3%, and the content of triethanolamine will similarly be limited, to avoid separation of the soil release promoting polymer, with the desirable limits being 0.5%, preferably 0.2% and most preferably 0%. In some instances the salt content will be held to limits lower than the allowed alkanolamine content because some salts can be even more detrimental to product stability than the alkanolamines. Of course, the content of anionic detergent present, which may be considered to be an ionizable salt, will not be included in the limiting proportions of such salt present because it does not appear to have the same type of destabilizing influence on the present compositions. While suitable adjuvants may be present in the liquid detergent, such as the colorant, perfume and fluorescent brightener, previously mentioned, normally the contents of such adjuvants will be minimized, usually being less than 2%, preferably less than 1% and more preferably less than 0.8%, but the dye and brightener are not destabilizing.

The liquid detergents may be made by mixing the various components thereof with the aqueous medium, preferably containing at least some of the lower alkanol, until they dissolve (or satisfactorily disperse) therein, or different components may be selectively dissolved in portions of the water and/or lower alkanol and then the various liquid fractions may be mixed together. It will often be preferable to adjust the pH of the liquid to within the range of 6.1 to 7.9, often more preferably 6.5 to 7.5, by addition of a suitable neutralizing agent which will not have a destabilizing influence on the soil release promoting polymer or the liquid product containing it, so that such polymer will not deteriorate and will not separate from the liquid detergent on storage, especially at elevated temperature. The preferred neutralizing agent is an aqueous solution of sodium hydroxide, which will normally be between 10 and 40% sodium hydroxide, preferably 15 to 25%, although more dilute concentrations may sometimes be desirable. Subsequently, the viscosity of the product may be adjusted by means of alkanol addition.

However, as mentioned above, it is one of the advantageous features of the present invention that the PET-POET copolymers prepared as described herein are highly resistant to deterioration even under alkaline wash conditions as will be shown below by specific examples.

The detergent composition may be used to wash (and treat) laundry containing synthetic fibers, such as those of polyester, e.g. Dacron ®, in the normal manner used in washing with other liquid or solid powdery or granular particulate detergents. However, less of the present product may be employed and in many cases the washing effects obtained will be superior. Different concentrations of the detergent may be used, normally being from about 0.02 to 0.3%, preferably 0.05 to 0.15%. Generally, it will be advised to use about ¼ cup (about 60 ml.) of the detergent per standard wash load (about 17 gallons, U.S., for a top loading washing machine), which is a concentration of about 0.1% of the detergent in the wash water. About the same concentration may be used when washing is in a front loading machine, although the water employed is less. Normally about 7 or 8 pounds (3 to 3.5 kg.), of laundry will be charged to the washing machine. The wash water will preferably be at least 120° F. (49° C.) but good washing and treatment with the soil release promoting polymer in the detergent is obtainable at the temperatures in the range of about 40° C. to 80° C., preferably 45° C. to 70° C. Generally, the dry weight of materials being washed and treated will be from about 5 to 15 or 20% of the weight of the aqueous washing medium, preferably about 5 to 10% thereof. The wash will be conducted with agitation over a period of about five minutes to one-half hour or one hour, often from 10 to 20 minutes. Then the washing materials will be rinsed, usually with several rinses, and will be dried, as in an automatic laundry dryer. Preferably, the first washing of the material to be treated will be when that material is not unduly dirty, so that the soil release promoting polymer will be deposited on as clean a surface as possible. However, this is not necessary and improvements in the cleaning of subsequently soiled materials and swatches will be observed when no special effort is made to have the first washing be that of a cleaner substrate. Up to a limit, sometimes about 3 or 5 treatments, plural washings with the detergent of this invention increase the soil releasing properties of the treated material.

When polyester and polyester/cotton blend fabrics are washed in the manner described with the compositions of this invention, and are then soiled or spotted with dirty motor oil and washed with a detergent of this invention or another commercial detergent (often of the built type), significant removal of the lipophilic soil is noted, compared to similar treatments in which the liquid detergent employed initially did not contain any soil release promoting polymer. In other comparisons, when substantial proportions of water soluble ionizable salt, such as 5% of sodium sulfate, or 1% of triethanolamine are present in the liquid detergent it is found that after storage at elevated temperature (43° C.) for two weeks, simulating a lengthier storage at room temperature, phases separate from the liquid detergent body and the soil release promoting properties of the polymer contained therein are diminished. Thus, the compositions of this invention are important because they are stable on storage, resulting in a more effective product for the purpose intended, soil release improvement, and also resulting in a more attractive product which does not separate on storage.

The following examples illustrate the invention but do not limit it. Unless otherwise indicated, all parts are by weight and all temperatures are in °C.

EXAMPLE 1

Using either the following catalyst system (A) or catalyst system (B) polyethylene terephthalate-polyoxyethylene terephthalate soil release polymers SRP-A or SRP-B, respectively, were produced under the following conditions:

Catalyst system (A): mixture of antimony trioxide (0.005 weight percent based on total weight of reactants) and calcium acetate (0.005 weight percent based on total weight of reactants);

Catalyst system (B): mixtures of titanium (IV) isopropoxide (TiIPO) (0.01 weight percent based on total weight of reactants) and sodium isopropoxide (0.01 weight percent based on total weight of reactants).

Three hundred grams polyethylene glycol (MW=3350) Carbowax 3350 and 45 grams polyethylene terephthalate (from scrap soda bottles, available as R-60 from Burcham Associates) are mixed at 150° C. under vacuum (0.2-0.1 mm Hg) for 30 minutes and either catalyst system (A) or catalyst system (B) is added. The temperature is raised to 275° C. and as the polycondensation reaction proceeds ethylene glycol is liberated. After about 1 hour the temperature is lowered to about 150° C. at which time the vacuum is released under nitrogen. The products SRP-A or SRP-B are cooled to ambient temperature. SRP-A has a molecular weight of about 19,000 and SRP-B has a molecular weight of about 20,000.

The improved soil removal properties of the invention poymers are demonstrated by washing swatches of Dacron Filament Weave (DFW), Dacron Single Knit (DSK), Dacron Pile (DP), and 35/65 Dacron-Cotton (D/C). As a first step, a deposition wash is conducted at 120° F. or 80° F. in aqueous medium containing 0.002% SRP-A or SRP-B, and 0.02% Neodol 25-7, a liquid surfactant which is a mixed fatty alcohol of from 12 to 15 carbon atoms condensed with an average of 7 moles ethylene oxide per mole of fatty alcohol. After 15 minutes wash, the swatches are hand rinsed, air dried and stained. After aging overnight, a wash release at 120° F. or 80° F. is conducted in an aqueous medium containing 0.06% Fresh Start, a commercially available product of Colgate Palmolive which is particulate nonionic detergent formulation obtained by post-spraying nonionic surfactant such as Neodol 25-7 onto base beads, composed primarily of builders for 15 minutes. The pH of the wash water was 8.4–8.6. QCF polymer (a copolymer of polyethylene terephthalate and polyoxyethylene terephthalate of a molecular weight of about 10,000 wherein the polyoxyethylene is of a molecular weight of about 3,400, the molar ratio of polyethylene terephthalate to polyoxythylene terephthalate units is about 3:1 and the proportion of ethylene oxide to phthalic moiety in the polymer is about 22:1) is included as control, and Fresh Start without any polymer is a second control. The results are shown in Table 1.

TABLE 1

| Composition | Soil Removal, % | | | | | | | |
|---|---|---|---|---|---|---|---|---|
| | Dirty Motor Oil | | | | Wesson Oil | | Sebum | |
| | DFW | DSK | DP | D/C | DFW | DP | DFW | Average |
| 120° F. | | | | | | | | |
| F.S. w/o Polymer | 3.2 | 5.2 | 5.4 | 24.8 | 11.8 | 52.6 | 21.5 | 17.5 |
| F.S. + QCF | 54.7 | 95.5 | 16.0 | 44.7 | 97.8 | 71.6 | 98.3 | 68.4 |
| F.S + SRP-(A) | 85.8 | 97.3 | 42.7 | 58.0 | 95.4 | 70.1 | 96.0 | 77.9 |
| F.S + SRP-(B) | 87.7 | 98.9 | 62.7 | 65.4 | 96.2 | 81.8 | 99.1 | 84.5 |
| 80° F. | | | | | | | | |
| F.S. w/o Polymer | 4.1 | 1.8 | 2.5 | 17.3 | 2.0 | 10.6 | 8.5 | 6.7 |
| F.S. + QCF | 45.3 | 37.2 | 10.3 | 33.6 | 84.6 | 50.1 | 50.7 | 44.6 |
| F.S. + SRP-(A) | 64.2 | 87.8 | 24.8 | 44.9 | 89.7 | 62.5 | 72.2 | 63.7 |
| F.S. + SRP-(B) | 65.2 | 86.2 | 29.5 | 50.0 | 89.0 | 68.6 | 72.8 | 65.9 |

To test the soil release promoting performance in a high alkalinity environment, sodium carbonate was added to the deposition wash to raise the pH to 10.5–10.6.

The results are shown in Table 2.

TABLE 2

| Composition | Soil Removal, % | | | | | | | |
|---|---|---|---|---|---|---|---|---|
| | Dirty Motor Oil | | | | Wesson Oil | | Sebum | |
| | DFW | DSK | DP | D/C | DFW | DP | DFW | Average |
| 120° F. | | | | | | | | |
| F.S. + QCF | 14.6 | 19.1 | 7.0 | 25.6 | 49.8 | 11.9 | 35.1 | 30.4 |
| F.S. + SRP-(A) | 62.6 | 88.1 | 12.0 | 32.8 | 89.6 | 30.3 | 95.5 | 58.7 |
| F.S. + SRP-(B) | 86.6 | 96.1 | 12.7 | 34.7 | 93.9 | 41.1 | 95.7 | 65.8 |
| 80° F. | | | | | | | | |
| F.S + QCF | 30.7 | 20.5 | 8.7 | 23.7 | 80.9 | 38.0 | 35.7 | 34.0 |
| F.S. + SRP-(A) | 68.9 | 88.8 | 17.7 | 35.2 | 89.4 | 54.9 | 66.5 | 60.2 |
| F.S. + SRP-(B) | 72.2 | 88.3 | 22.9 | 37.0 | 88.3 | 64.0 | 60.9 | 61.9 |

What is claimed is:

1. A method for preparing a soil-release promoting linear block copolymer of polyethylene terephthalate and polyethylene oxide terephthalate which comprises contacting polyethylene terephthalate with polyethylene glycol having a molecular weight in the range of from about 500 to about 10,000 under reduced pressure, and at a temperature in the range of from about 100° C. to about 350° C., in the presence of a catalytically effective amount of a mixed catalyst system wherein said catalyst system is titanium (IV) isopropoxide and sodium isopropoxide, wherein said titanium (IV) isopropoxide and sodium isopropoxide are used at a weight ratio of from about 3:1 to about 1:3, said linear block copolymer having a weight average molecular weight in the range of from about 15,000 to about 35,000.

2. The method of claim 1 wherein the polyethylene glycol reaqctant has a molecular weight of from about 1,000 to about 5,000.

3. The method of claim 1 wherein the copolymerization reaction is carried out at a pressure of less than about 5 mm Hg and at a temperature of from about 200° C. to about 300° C.

4. The method of claim 1 wherein the titanium (IV) isopropoxide and sodium isopropoxide are used at about 1:1 weight ratio.

5. The method of claim 1 wherein the polyethylene terephthalate reactant is obtained from recovered polyethylene terephthalate scrap material.

* * * * *